US009462227B2

(12) United States Patent
Duckworth et al.

(10) Patent No.: US 9,462,227 B2
(45) Date of Patent: *Oct. 4, 2016

(54) AUTOMATIC VIDEO LAYOUTS FOR MULTI-STREAM MULTI-SITE PRESENCE CONFERENCING SYSTEM

(71) Applicant: Polycom, Inc., San Jose, CA (US)

(72) Inventors: Mark R. Duckworth, Merrimack, NH (US); Gopal Paripally, Andover, MA (US); Youssef Saleh, Arlington, MA (US); Marcio Macedo, Cambridge, MA (US)

(73) Assignee: Polycom, Inc., San Jose, CA (US)

(*) Notice: Subject to any disclaimer, the term of this patent is extended or adjusted under 35 U.S.C. 154(b) by 166 days.

This patent is subject to a terminal disclaimer.

(21) Appl. No.: 13/970,231

(22) Filed: Aug. 19, 2013

(65) Prior Publication Data
US 2013/0328998 A1 Dec. 12, 2013

Related U.S. Application Data

(63) Continuation of application No. 13/024,101, filed on Feb. 9, 2011, now Pat. No. 8,537,195.

(51) Int. Cl.
H04N 7/15 (2006.01)

(52) U.S. Cl.
CPC .................................. H04N 7/152 (2013.01)

(58) Field of Classification Search
USPC ........................................................ 348/14.01
See application file for complete search history.

(56) References Cited

U.S. PATENT DOCUMENTS

| 6,240,555 | B1 | 5/2001 | Shoff et al. |
| 7,760,956 | B2 | 7/2010 | Lin et al. |
| 7,983,487 | B2 | 7/2011 | Agrawal et al. |
| 8,041,140 | B1 | 10/2011 | Georgiev |
| 8,068,723 | B2 | 11/2011 | Okada et al. |
| 8,112,712 | B2 | 2/2012 | Matsumoto |
| 8,145,656 | B2 | 3/2012 | Shatz et al. |
| 8,264,519 | B2 | 9/2012 | Lunde et al. |
| 8,327,253 | B2 | 12/2012 | Han et al. |
| 8,355,040 | B2 | 1/2013 | Trachtenberg et al. |
| 8,380,008 | B2 | 2/2013 | Patel et al. |
| 2003/0001948 | A1 | 1/2003 | Mochizuki |
| 2006/0080337 | A1 | 4/2006 | Mita et al. |
| 2006/0085479 | A1 | 4/2006 | Masukura et al. |
| 2006/0204092 | A1 | 9/2006 | Hamasaka et al. |
| 2010/0123770 | A1 | 5/2010 | Friel et al. |
| 2010/0225737 | A1* | 9/2010 | King ............... H04N 7/152 348/14.09 |
| 2010/0333004 | A1* | 12/2010 | Kristiansen ......... G06F 3/04883 715/765 |
| 2011/0016204 | A1 | 1/2011 | Wiener et al. |
| 2011/0018960 | A1 | 1/2011 | Eshkoli et al. |
| 2011/0205333 | A1 | 8/2011 | Wu et al. |
| 2011/0261259 | A1* | 10/2011 | Phillips ............ H04N 5/44591 348/565 |
| 2012/0200658 | A1 | 8/2012 | Duckworth et al. |

FOREIGN PATENT DOCUMENTS

| JP | 2004-208051 | 7/2004 |
| JP | 2009-239762 | 10/2009 |
| JP | 2010-157906 | 7/2010 |

OTHER PUBLICATIONS

Japanese Office Action filed in counterpart Japanese Application No. P2012-026497, dated Jan. 29, 2013, 4 pages (including translation).

EPO Search Report filed in counterpart EP Application No. 12152578.6, dated Jan. 16, 2015, 6 pages.

* cited by examiner

Primary Examiner — Amal Zenati
(74) Attorney, Agent, or Firm — Blank Rome, LLP

(57) ABSTRACT

A videoconference multipoint control unit (MCU) automatically generates display layouts for videoconference endpoints. Display layouts are generated based on attributes associated with video streams received from the endpoints and display configuration information of the endpoints. An endpoint can include one or more attributes in each outgoing stream. Attributes can be assigned based on video streams' role, content, camera source, etc. Display layouts can be regenerated if one or more attributes change. A mixer can generate video streams to be displayed at the endpoints based on the display layout.

17 Claims, 7 Drawing Sheets

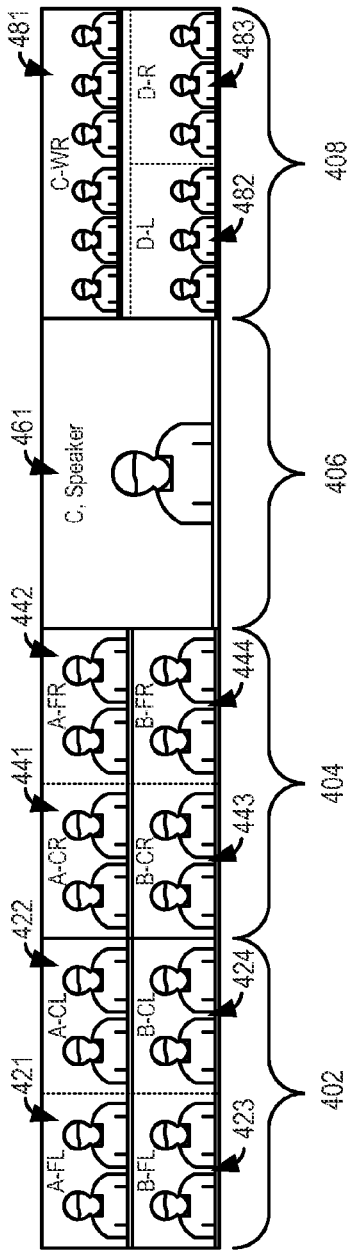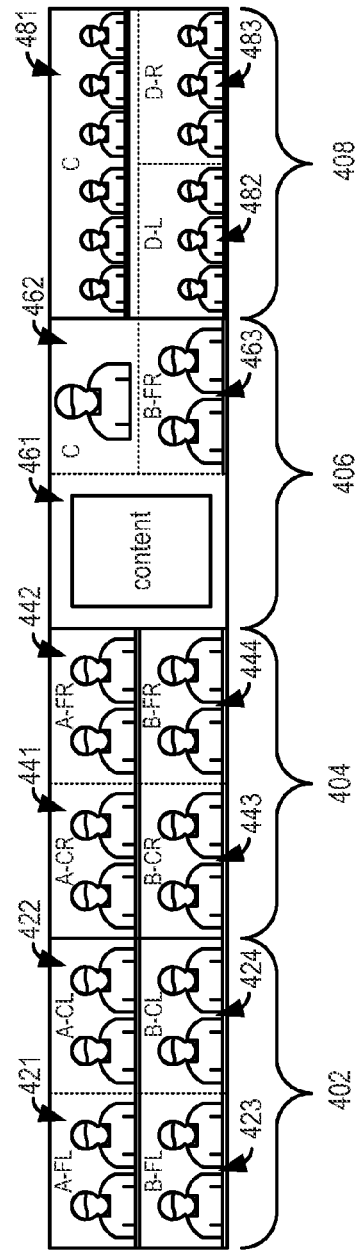
FIG. 4C
FIG. 4D

Stream 2:

| Frame size | 1080x1920 |
|---|---|
| No. of cells | 1 |
| Cell sizes | 1080x1920 |
| Cell input streams | Cell 1: A-CL |
| Assign attribute | CR, Speaker |
| ... | ... |

491

Endpoint E: # of streams=4

Stream 1:

| Frame size | 1080x1920 |
|---|---|
| No. of cells | 4, equal, 2x2 |
| Cell sizes | 270x480 |
| Cell input streams | Cell 1: A-FL; Cell 2: A-CL<br>Cell 3: B-FL; Cell 4: B-CL |
| Assign attribute | FL |
| ... | ... |

AUTOMATIC VIDEO LAYOUTS FOR MULTI-STREAM MULTI-SITE PRESENCE CONFERENCING SYSTEM

CROSS REFERENCE TO RELATED APPLICATIONS

This application is a continuation of U.S. patent application Ser. No. 13/024,101, filed Feb. 9, 2011, titled "Automatic Video Layouts for Multi-Stream Multi-Site Telepresence Conferencing System", the entire contents of which is incorporated herein by reference for all purposes.

FIELD OF THE INVENTION

The present invention relates generally to videoconferencing systems, and more particularly to multi-stream, multi-site conferencing systems.

BACKGROUND

Videoconferencing entails exchange of audio, video, and other information between at least two participants. Generally, a videoconferencing endpoint at each participant location will include a camera for capturing images of the local participant and a display device for displaying images of remote participants. The videoconferencing endpoint can also include additional display devices for displaying digital content. In scenarios where more than two endpoints participate in a videoconferencing session, a multipoint control unit (MCU) can be used as a conference controlling entity. The MCU and endpoints typically communicate over a communication network, the MCU receiving and transmitting video, audio, and data channels from and to the endpoints.

Telepresence technologies provide enhanced videoconferencing experience to participants so that the near end participants feel as if they are present in the same room as the far end participants. Telepresence videoconferencing can be provided for various conferencing systems, ranging from two person point-to-point videoconferencing systems to multi-participant multipoint videoconferencing systems. Typically, telepresence utilizes multiple cameras to capture images of near end participants and multiple displays to display images of far end participants. Multiple video streams are transmitted from multiple endpoints to the MCU to be combined into one ore more combined video streams that are sent back to the endpoints to be displayed on multiple display devices. For example, in a telepresence system involving three endpoints, each endpoint having three cameras, the MCU will receive nine video streams. The MCU will have to combine the nine received video streams into one or more combined video streams, which are sent back to be displayed on the display devices at each endpoint. These nine video streams will have to be laid out for each endpoint based on the number and type of displays at each endpoint. Furthermore, although the MCU may receive the information from the endpoint that the current speaker is located at that endpoint, with more than one video stream being received from each endpoint the MCU may not be able to determine which one of the multiple video streams includes the current speaker. Thus, dynamically selecting one of many video streams received from an endpoint for prominent display may be difficult.

Traditionally, for multi-point and multi-stream videoconferencing systems, arrangement of video streams to be sent to each endpoint is carried out manually. For example, video network operation centers, also known as VNOC, offer manual management of telepresence videoconferencing that includes appropriate layout of incoming video streams into combined outgoing video streams. The person managing the videoconference at the VNOC monitors the video streams for current speakers, and then manually arranges the layout so that the video stream having the current speaker is prominently displayed on the display screens at each endpoint. Prominently displaying the current speaker's image may involve manipulating the scale and size of the displayed video stream. Again, the person managing the videoconference would manually carry out the scaling and sizing procedure. However, the manual management of VNOC can be plagued by human errors and delays. Additionally, employing a human operator along with providing the required specialized training for operating equipment can be very costly.

In summary, traditional approaches are plagued by static layout arrangements of video streams or the necessity to use error prone manual control if dynamic layout arrangement is desired.

SUMMARY

A continuous presence, telepresence, videoconference MCU is disclosed that automatically generates layouts of video streams to be presented to videoconference endpoints. A videoconference endpoint can include two or more video cameras, at least one display device, coupled to a processor. The processor can include a codec for encoding video and audio streams for transmission and decoding received video and audio streams. The processor can also include a stream attribute module for assigning attributes to outgoing streams. The endpoint can also include a speaker locator for determining the location of a current speaker from among the participants. The processor can then determine the camera that captures the current speaker. Subsequently, the processor can instruct the attribute module to add an attribute to the video stream generated by that camera, which attribute when examined by an MCU or another endpoint can indicate that the associated video stream includes the image of the current speaker.

The attribute module can assign various attributes to a single video stream. Some attributes can be position based, specifying the position of the camera that is the source of the video stream. For example position based attributes can include "FR" (far right), "CL" (center left), etc. Some attributes can be role based, specifying the role of the participants included in the video stream. For example, role based attributes can include "people," "content," etc. Role based attributes can have hierarchical classifications, such as, "people/audience," "people/presenter," etc. Video streams can be assigned more than one attributes. For example, a video stream captured by the far right camera that also includes the image of the current speaker can have attributes "FR" and "Speaker." As another example, a video stream having the role based attribute "people/audience" can also have the "Speaker" attribute if one of the audience members is also the current speaker.

The MCU can include a layout manager and a mixer. The layout manager generates layouts for video streams sent to each endpoint based on the attributes of incoming video streams and the configuration information associated with each endpoint. Such configuration information can include, for example, the number of display screens, the aspect ratio of each display screen, dedicated speaker display screen, etc.

The mixer can combine video streams based on the layout determined by the layout manager. The combined streams can be transmitted to the appropriate endpoints. The layout manager monitors any changes in the attributes of each incoming video stream, the number of incoming video steam, configuration information of each endpoint, etc., and dynamically alters the layout based on these changes.

BRIEF DESCRIPTION OF THE DRAWINGS

Exemplary embodiments of the present invention will be more readily understood from reading the following description and by reference to the accompanying drawings, in which:

FIG. 4A-4D shows various exemplary display layouts;

FIG. 4E illustrates exemplary layout data generated by the layout manager; and

DETAILED DESCRIPTION

Figure 1:
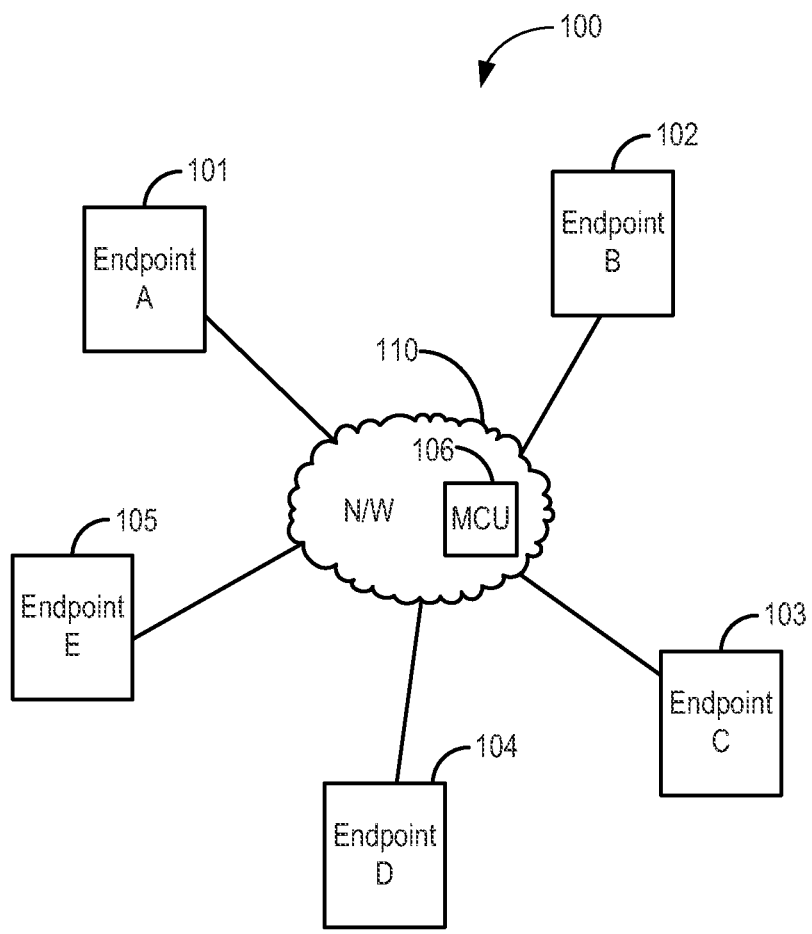
FIG. 1 depicts an exemplary multipoint videoconferencing system.

FIG. 1 depicts an exemplary multipoint videoconferencing system 100. System 100 can include network 110, one or more multipoint control units (MCU) 106, and a plurality of endpoints A-E 101-105. Network 110 can be, but is not limited to, a packet switched network, a circuit switched network, or a combination of the two. Endpoints A-E 101-105 may send and receive both audio and video data. Communications over the network can be based on communication protocols such as H.320, H.324, H.323, SIP, etc., and may use compression standards such as H.263, H.264, etc. MCU 106 can initiate and manage videoconferencing sessions between two or more endpoints. Generally, MCU 106 can mix audio data received from one or more endpoints, generate mixed audio data, and send mixed audio data to appropriate endpoints. Additionally, MCU 106 can receive video streams from one or more endpoints. One or more of these video streams may be combined by the MCU 106 into combined video streams. Video streams, combined or otherwise, may be sent by the MCU 106 to appropriate endpoints to be displayed on their respective display screens. As an alternative, MCU 106 can be located at any one of the endpoints A-E 101-105.

Figure 2:
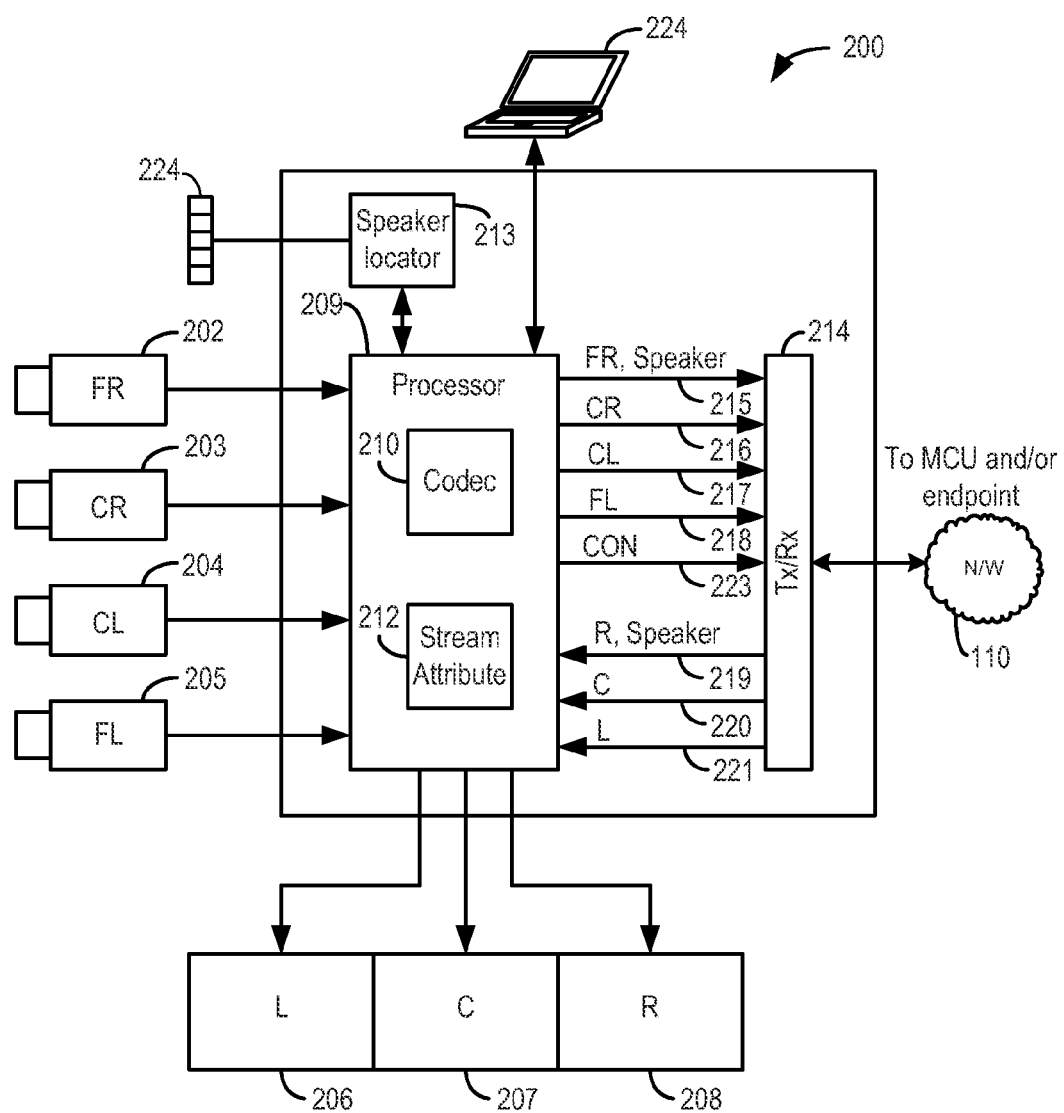
FIG. 2 shows an exemplary videoconferencing endpoint.

FIG. 2 shows an exemplary endpoint 200 with multiple cameras and multiple display devices. Cameras 202-205 capture images of the local participants present in the conference room, and can be arranged in a row to capture different portions of the conference room. Accordingly, cameras 202-205 can be labeled FR (far-right), CR (center right), CL (center left), and FL (far left). Of course, these labels are only exemplary. Different labels can also be used, for example, if camera 205 is used to capture images of all participants then it can be labeled as WR (whole room). In another instance, camera 202 can be a pan-tilt-zoom (PZT) type camera that captures the image of the current speaker only, from among the local participants, and thus can be labeled CS (current speaker). Labels or attributes can be associated with the cameras and stored in memory in the processor 209.

Processor 209 can include a codec 210 for compressing and decompressing video and audio streams. For example, codec 210 can compress video streams generated by cameras 202-205 to generate compressed video streams, which can be transmitted to remote endpoints and/or an MCU. Additionally, codec 210 can decompress video streams received from the remote endpoints or the MCU, and display the video streams on display devices 206, 207, and 208. Codec 210 can include video codecs such as H.261 FCIF, H.263 QCIF, H.263 FCIF, H.261 QCIF, H.263 SQCIF, H.264, etc., and audio codecs such as G.711, G.722, G.722.1, G.723.1, etc.

Processor 209 can communicate with a speaker locator module 213, which determines the location of the current speaker, i.e., the participant that is currently speaking Information provided by speaker locator module 213 can be used by processor 209 to determine which of the received video streams includes the current speaker. Speaker locator module 213 can employ a microphone array 224 that analyzes the sound received from a source, such as the current speaker, to determine the location of the current speaker with respect to the microphone array 224. The microphone array 224 can include a series of spaced microphones that can be arranged horizontally, vertically, or in combination. Typically, at least one of the microphones in the array can be assigned as a reference microphone. A number of candidate locations can be predetermined where the distance of the candidate locations from each of the microphones is known. Acoustic signals captured by each of the microphones can be delayed with respect to the acoustic signal captured by the reference microphone. This delay can be, in part, a function of a candidate source location and microphone location with respect to the reference microphone. Signal energies of each of the delayed signals associated with each candidate location can then be determined. Subsequently, the candidate location associated with the highest signal energy can be selected as the location that best estimates the actual location of the audio source. In other words, using maximum likelihood estimation, a predetermined candidate source that is likely to be the best estimate of the actual location of the audio source can be selected as the location of the audio source. Clearly, the accuracy of the estimation can improve with an increase in the number and spatial distribution of the candidate locations. For example, 61 candidate locations can be used at an approximate radial distance of 10 feet from the microphones. More details on determining locations of participants using microphone arrays are disclosed in commonly assigned U.S. Pat. No. 6,912,178 entitled "System and method for computing a location of an acoustic source," by Chu et al., and is hereby incorporated by reference.

Typically, the spatial relationship between the microphone array 224 and the cameras 202-205 remains fixed. Therefore, location of the current speaker known with respect to the microphone array 224 can be readily transformed into the location of the current speaker with respect to the cameras simply by changing the frame of reference. Each camera, with its particular pan-zoom-tilt settings, can capture a particular portion of the conference room, the boundaries of which portion can be predetermined. Thus, the processor 209 can determine if the location of the current speaker, as expressed within the reference frame of the camera, lies within the portion of the conference room captured by that camera. If the current speaker is located within the portion of the conference room captured by a camera, processor 209 can instruct the stream attribute module 212 to assign the attribute "Speaker" to the video stream generated by that camera.

Stream attribute module 212 can assign attributes to the outgoing streams. These attributes can qualify the outgoing video stream in a manner that is useful for the MCU and/or the remote endpoint for rendering and displaying the video stream. These attributes can be added to outgoing streams during transmission. For example, protocols such as H.323 and H.320 can be extended to include attribute definitions that may be used to label outgoing data streams. Video streams can have various attributes. For example, video streams can have positional attributes that identify the relative location of the camera that is the source of that video stream. As shown in FIG. 2, outgoing streams 215-218 can have attributes that indicate the relative position of their source cameras. Stream 215, for example, is labeled "FR" because it is sourced from the camera 202, which is placed in the far right (FR) position. Similarly, video stream 217 is labeled "CL" because its source camera 204 is in a center left (CL) position.

Video steams can also have role based attributes such as "people" and "content." Video streams can be labeled with "people" attribute if the video streams include images of people/participants. Role based attributes can further have hierarchical classification. For example, where a number of participants in a video conference take turns presenting information, classification of "people/presenter" and "people/audience" may be provided. A "people/presenter" attribute can indicate that the associated video stream includes images of people that are to be prominently displayed irrespective of whether the video stream includes a speaker or not. Video streams that contain digital content, such as presentations, can have a "content" attribute. For example, processor 209 receives data content from computer 224, which data content can include presentations, documents, videos, etc. Data content can be compressed and given the attribute "CON." Although not shown, in FIG. 2, the endpoint can also include a dedicated data content display, which displays data streams received from MCU or remote endpoints.

Video streams can also have more than one attribute. For example, a video stream can have both role based and "Speaker" attribute, such as "people/audience, Speaker," "people/presenter, Speaker," etc. The "Speaker" attribute can be assigned independent of the role of the video stream. For example, even if the current speaker is included in a video stream having the "people/audience" role, a "Speaker" attribute can be additionally assigned to that video stream. As another example, video streams can have both positional and "Speaker" attribute, such as, video stream 215—where in addition to having the "FR" attribute it can also have the "Speaker" attribute. As previously described, processor 209 can determine which camera is capturing the current speaker. The processor can then add the "Speaker" attribute to the video stream generated by that camera. In the example shown in FIG. 2, the current speaker is being captured by camera 202; therefore, video stream 215 has the attribute "Speaker" associated with it. If the location of the current speaker changes, then the processor can reassign the "Speaker" attribute to the video stream that currently includes the current speaker. For example, if a different speaker begins to talk, and the image of that current speaker is captured by camera 204, then video stream 217 will be assigned the attribute "Speaker" in addition to the "CL" attribute.

Although only a single outgoing stream 215 of FIG. 2 is shown to have multiple attributes, such multiple attributes can be assigned to more than one stream. For example, stream 218 also can have multiple attributes such as "people/presenter" and "FL" assigned to it. Thus, video streams can be assigned one or more attributes, and the assigned attributes can be role based, camera position based, current speaker based, or based on any other selected property. It is understood that the attributes shown in FIG. 2 can be encoded for transmission.

Video streams, data streams, and audio streams, along with their attributes can be transmitted by the endpoint 200 to an MCU or a remote endpoint via network 110. A transmitter/receiver 214 can serve as a physical interface between the endpoint 200 and the network 110. Tx/Rx 214 can also receive video streams from the MCU or remote endpoints. For example, video streams 219-221 are received by the processor 209. Video streams 219-221 can include attributes that qualify the video streams and can be used by the processor 209 for rendering or reproducing the video streams. For example, video stream 219 has attributes "R" and "Speaker." Processor 209 can display video stream 219 on display device 208, which is positioned to the right. Furthermore, because video stream 219 has the "Speaker" attribute as well, the video stream may be displayed with more prominence. Likewise, video stream 220 with attribute "C" can be displayed on display device 207 and video stream 221 with attribute "L" can be displayed on display device 206.

Figure 3:
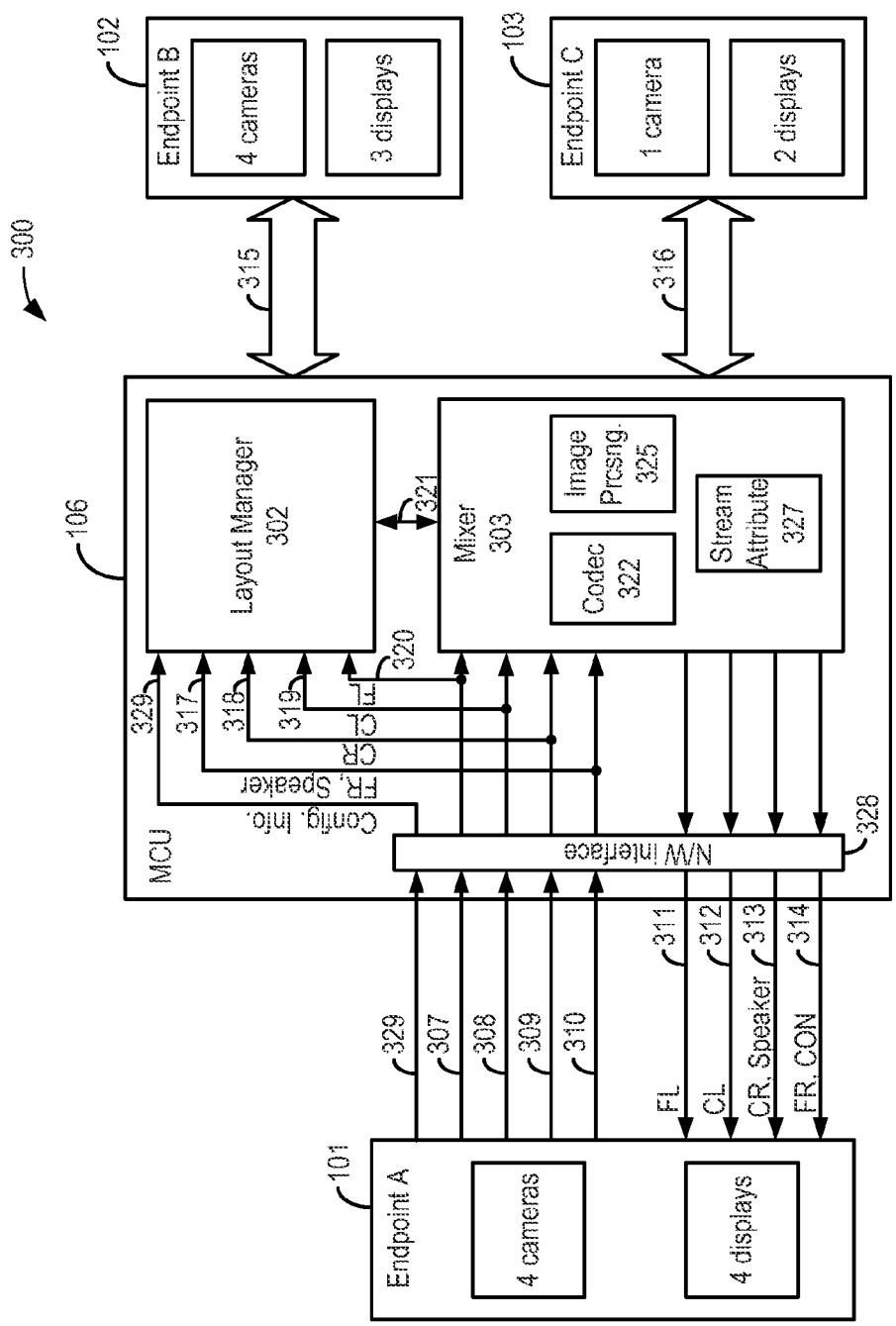
FIG. 3 shows an exemplary videoconferencing system in which two or more endpoints communicate with each other via an MCU.

FIG. 3 shows an exemplary conferencing system 300 in which two or more endpoints communicate with each other via an MCU 106. Endpoints 101, 102, and 103 can be similar to the exemplary endpoint shown in FIG. 2. Each endpoint can have various configurations of cameras and display screens for providing a telepresence experience to their respective participants. For example, endpoint A 101 can include 4 cameras and 4 display devices, endpoint B 102 can include 4 cameras and 3 display devices, while endpoint C 103 can include 1 camera and 2 display devices. Video streams can be exchanged between each endpoint and the MCU 106. For clarity, only video streams to and from endpoint A 101 have been shown in detail. MCU 106 can also include network interface 328, via which video, audio, and signaling data can be sent and received.

MCU 106 can include a layout manager 302 and a mixer 303. The layout manager 302 can determine display or video layouts, which include an arrangement of video streams sent to each endpoint. In determining video layouts, the layout manager 302 not only determines which ones of the received video streams are to be sent to an endpoint, but also the spatial arrangement in which they are to be displayed. This determination can be based on the attributes associated with the received video streams and configuration information associated with the endpoint. The layout manager 302 can determine attributes associated with each video stream received by MCU 106. For example, attributes "FR, Speaker" 317, "CR" 318, "CL" 319, and "FL" 320 associated with video streams 307, 308, 309, and 310 can be received from endpoint A 101. Similarly, video streams and their attributes can also be received from endpoints B 102 and C 103 (denoted, for simplicity, by 315 and 316, respectively), and any additional endpoints. Configuration information 329 received from each endpoint can include number of display devices, aspect ratio and resolution of display devices, existence of a dedicated current speaker display device, type of encoding used, etc. As will be described with further detail below, the layout manager 302 can generate arrangement of video streams sent to each endpoint. This arrangement is communicated to the mixer 303 for execution by way of signal path 321.

Mixer 303 can receive video streams from one or more endpoints. Mixer 303 can execute the arrangement of video streams determined by the layout manager 302. For example, mixer 303 can receive video streams from endpoints A 101, B 102, and C 103, combine the video streams based on signals 321 received from the layout manager 302, and send combined video streams back to each endpoint. Mixer 303 can include a codec 322 for decoding incoming video and audio streams and encoding outgoing video and audio streams. For example, audio codecs can include standard codecs such as, G.711, G.722, G.722.1, G.723.1, etc. Video codecs can include standard codecs, such as, H.261 FCIF, H.263 QCIF, H.263 FCIF, H.261 QCIF, H.263 SQCIF, H.264, etc. Codec 322 can also change the encoding scheme of outgoing audio and video streams based on the encoding scheme used at the receiving endpoint.

Mixer 303 can also include an image processing module 325 for carrying out manipulation of video frames received from various endpoints. Such manipulations can include combining two or more video frames into one frame, scaling, cropping, overlaying, etc., more details of which are disclosed in commonly assigned U.S. patent application Ser. No. 12/581,626 entitled "System and method for combining a plurality of video stream generated in a videoconference," by Avishay Halavy, and is hereby incorporated by reference.

Mixer 303 can also include a stream attribute module 327 for assigning attributes to outgoing streams. For example, stream attribute module 327 can assign attributes "FL", "CL", "CR, Speaker", and "FR, CON" to streams 311, 312, 313, and 314, respectively. The stream attribute module 327 can receive instructions on which attributes to assign to particular outgoing video streams from the layout manager 302.

MCU 106 can be compliant with the ITU standards, such as, but not limited to, H.320, H.323, and H.324. Accordingly, the layout manager 302 can be part of a media controller (MC), while the mixer 303 can be part of a media processor (MP). Mixer 303 can be implemented on application specific integrated circuits (ASICs), microcontrollers, FPGAs, hardware/firmware combination, software running on microprocessors, etc. Various modules within the mixer 303, e.g., codec 322, Image processing module 325, and stream attribute module 327 can be individual hardware modules or can be software/firmware modules. Layout manager 302 can also be implemented separately as a hardware component such as a microcontroller, ASIC, FPGA, hardware/firmware combination, software, etc.

Figure 4A:
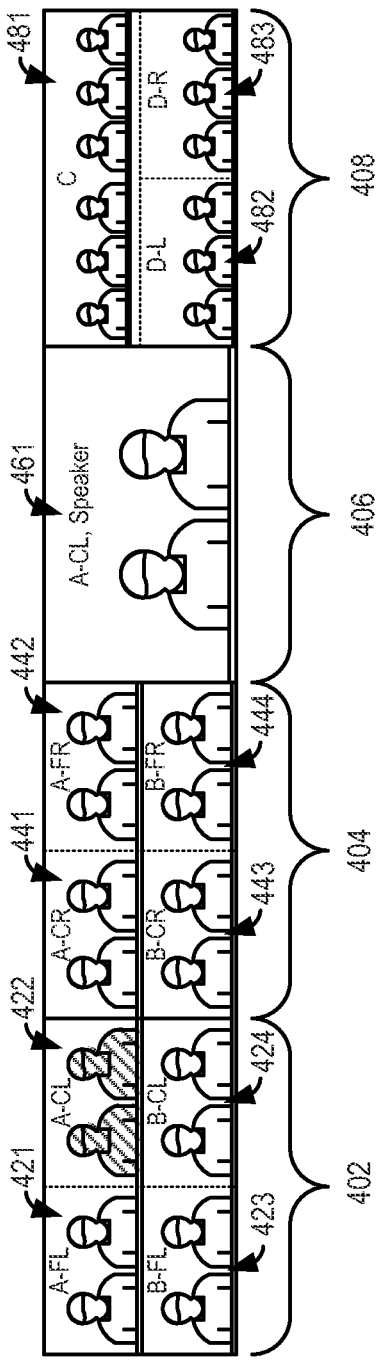

FIG. 4A shows an example of the layout of images of various endpoints. In the example shown, the MCU 106 transmits video streams to an endpoint, say endpoint E, having four display devices 402, 404, 406, and 408. The videoconference can include four other endpoints, say A, B, C, and D. The layout manager 302 can receive attributes associated with video streams generated by each of the five endpoints A, B, C, D, and E, and determine the layout of outgoing video streams to be displayed on each of the display devices at each endpoint. Outgoing video streams can also include attributes, which allow the endpoints to determine the display device on which the video streams are to be displayed. For example, video streams received by endpoint E can include attributes, such as "FL" (far left display device), "CL" (center left display device), "CR, Speaker" (center right display device) and "FR" (far right display device), etc. Outgoing video stream for each display device may be a composite of video streams from multiple sources. The layout manager 302 can determine the number of "cells" to be displayed within each display device, where the video displayed within a cell corresponds to a single source. For example, the combined video stream displayed on display device 402 can be composed of four cells 421-424. For illustration, the cells are labeled with the source assigned to them, such as A-FL (endpoint A, camera far left), A-CL (endpoint A, camera center left), B-FL (endpoint B, camera far left), and B-CL (endpoint B, camera center left). Of course, these labels are not displayed to the participants.

Endpoint E can also include one or more display devices for displaying only the video streams that include the current speakers. Any display devices can be selected, however, display device 406 has been shown as an example. As mentioned previously, the layout manager 302 can determine which of the incoming video streams includes the speaker based on the attributes associated with each video stream. The layout manager 302 can then arrange that video stream such that it is displayed on the particular display device reserved for the video stream including the current speaker in addition to arranging the same video stream such that it is displayed in a cell on one of the other display devices. For example, in FIG. 4A, the video stream received from the center-left camera at endpoint A includes the current speaker. Layout manager 302 can include the video stream in cell 422 of the video stream displayed on display device 402 in addition to having only that video stream also been displayed on the display device 406 (note that image of participants in cell 422 has been shaded merely for indicating that the associated video stream includes the speaker).

The layout manager 302 can also dynamically arrange the output streams in response to changes in the attributes of the input streams. For example, if the current speaker changes from one video stream to another, the layout manager 302 can rearrange the output streams to reflect this change. As shown by way of example, in FIG. 4B, the current speaker is now located in the video stream of the left camera at endpoint D. This video stream can have the attribute "Speaker" associated with it, which attribute can be detected by the layout manager 302. Consequently, the layout manager can rearrange the output streams so that the video stream directed to the display device 406 is the video stream received from the left camera at endpoint D, replacing the previously displayed video stream from center-left camera of endpoint A.

The layout manager 302 can provide continuous presence experience to the conference participant. In other words, the conference participant can view video streams from all endpoints simultaneously, and not just from the endpoint that includes the current speaker. For example, referring to FIG. 4A, even though the current speaker is located at endpoint A, the participant at endpoint E can receive video streams from each of the other participating endpoints A, B, C, and D. Additionally, the conference participant can view video streams of participants other than the current speaker. For example, if the current speaker is at endpoint A, then the participants at endpoint E can see video streams capturing images of other participants in addition to the video stream capturing the current speaker. Furthermore, even when the location of current speaker changes from one endpoint to another (e.g., from endpoint A to endpoint D), the layout manager 302 still maintains continuous presence display of video streams.

FIG. 4C shows an exemplary layout of video streams when one of the endpoints has a dedicated speaker camera. For example, endpoint C can include at least two cameras: one for capturing the whole room, and another for capturing the current speaker in the room. The camera capturing the whole room can be a wide angle camera, while the camera capturing the speaker only can be a pan-tilt-zoom camera. Note that an endpoint can include a speaker locator module (e.g., FIG. 2, 213) that determines the location of the current speaker. The processor can use this location information to control the PTZ camera so that the camera predominantly captures the image of the current speaker. The stream attribute module of the endpoint can assign an attribute "C-WR" to the video stream of the camera capturing the whole room while assign the attribute "C-Speaker" to the video stream of the PTZ camera. Upon receiving these video streams from endpoint C, the layout manager 302 of MCU 106 can assign the video stream with "C-WR" attribute to cell 481, while assign the video stream with "C-Speaker" attribute to the display device 406.

Figure 4B:
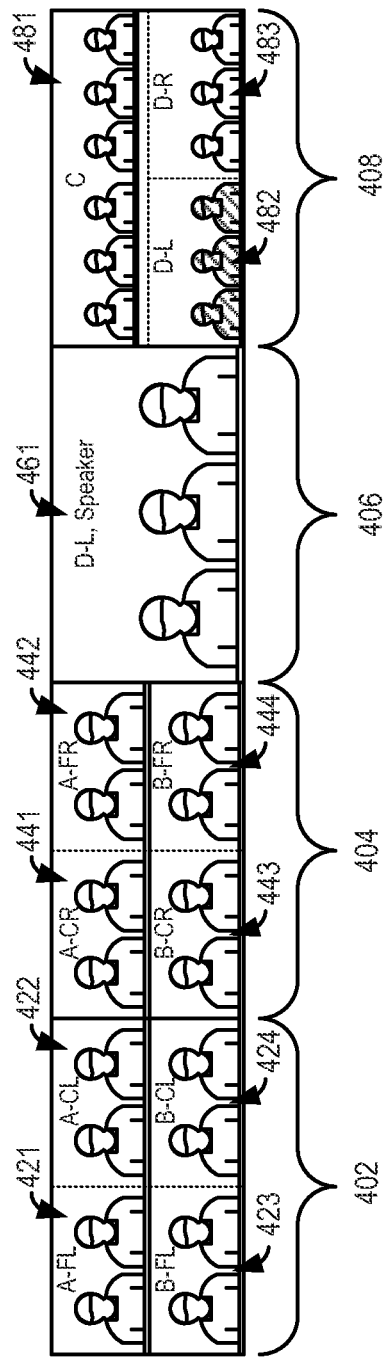

In comparison with FIGS. 4A-4C, in which the display screen 406 was reserved to display only the current speaker and in which the video stream sent to the display device 406 was not divided into cells, the example shown in FIG. 4D can include multiple cells showing digital content in addition to a current speaker. The video stream sent to display device 406 can include three cells 461, 462, and 463. Cell 461 can include a data content video stream, which data content can include presentations sourced from, e.g., a computer at one of the endpoints. Cells 462 and 463 can include images of the last two current speakers. One or the cells 462 or 463 may display a video stream having the attribute "people/presenter," which indicates that the associated video stream should always be prominently displayed.

FIG. 4E illustrates exemplary layout data that the layout manager 302 can generate and send to the mixer 303. Mixer 303 can use this data to generate outgoing streams for endpoints participating in the video conference. As an example, FIG. 4E shows layout data corresponding to the display layout depicted for display screens 402 and 406 in FIG. 4A. It is understood that layout data for other streams for the same endpoint E, as well as layout data for other streams for other endpoints can be similarly generated.

Layout data 490 includes several parameters that the mixer 303 can use to mix video streams. For example, the frame size indicates the number of horizontal and vertical pixels in each frame of stream 1. The layout manager 302 can determine the frame size based on the resolution of the display screen. Information on resolution is typically received as configuration information from endpoint E. So if the resolution of the display screen were 720×1280, then the layout manager 302 may select 720×1280 as the frame size. The No. of cells field defines the number of portions in which the frame is divided into. For example, referring to FIG. 4A, the frame displayed on display device 402 is divided in 4 cells of equal size and arranged in two rows and two columns (2×2). The cell size indicates each cell size in pixels. In instances where the cells are of unequal sizes, the cell size field can include additional cell sizes corresponding to each cell. The next field indicates the source stream for each cell within the frame. In this example, the top two cells, cell 1 and cell 2 (corresponding to portions 421 and 422 in FIG. 4A), are assigned video streams received from endpoint A and having attributes FL and CL, respectively. The layout manger 302 can also assign an attribute to the outgoing stream so that the receiving endpoint E can determine the display device on which this video stream is to be displayed, for example, on the far left (FL) display device 402. Layout data 491 can correspond to the layout of video streams on display device 406 of FIG. 4A. Because display device 406 is dedicated to display only one video stream (that includes the current speaker), the frame includes only a single cell. The layout manager can assign an attribute so that the endpoint can display stream 2 on the center right (CR) display device 406.

The layout manager 302 can send layout data (e.g., 490 and 491) to mixer 303 via signal path 321. The layout manager 302 can also store the layout data in memory that can be accessed by the mixer 303. Such memory can include registers, RAM, etc. Mixer 303 can access layout data repeatedly to check if the layout data has changed. Alternatively, the layout manager 302 can set a flag or cause and interrupt each time there is any change in the layout data or if the memory is updated.

Figure 5:
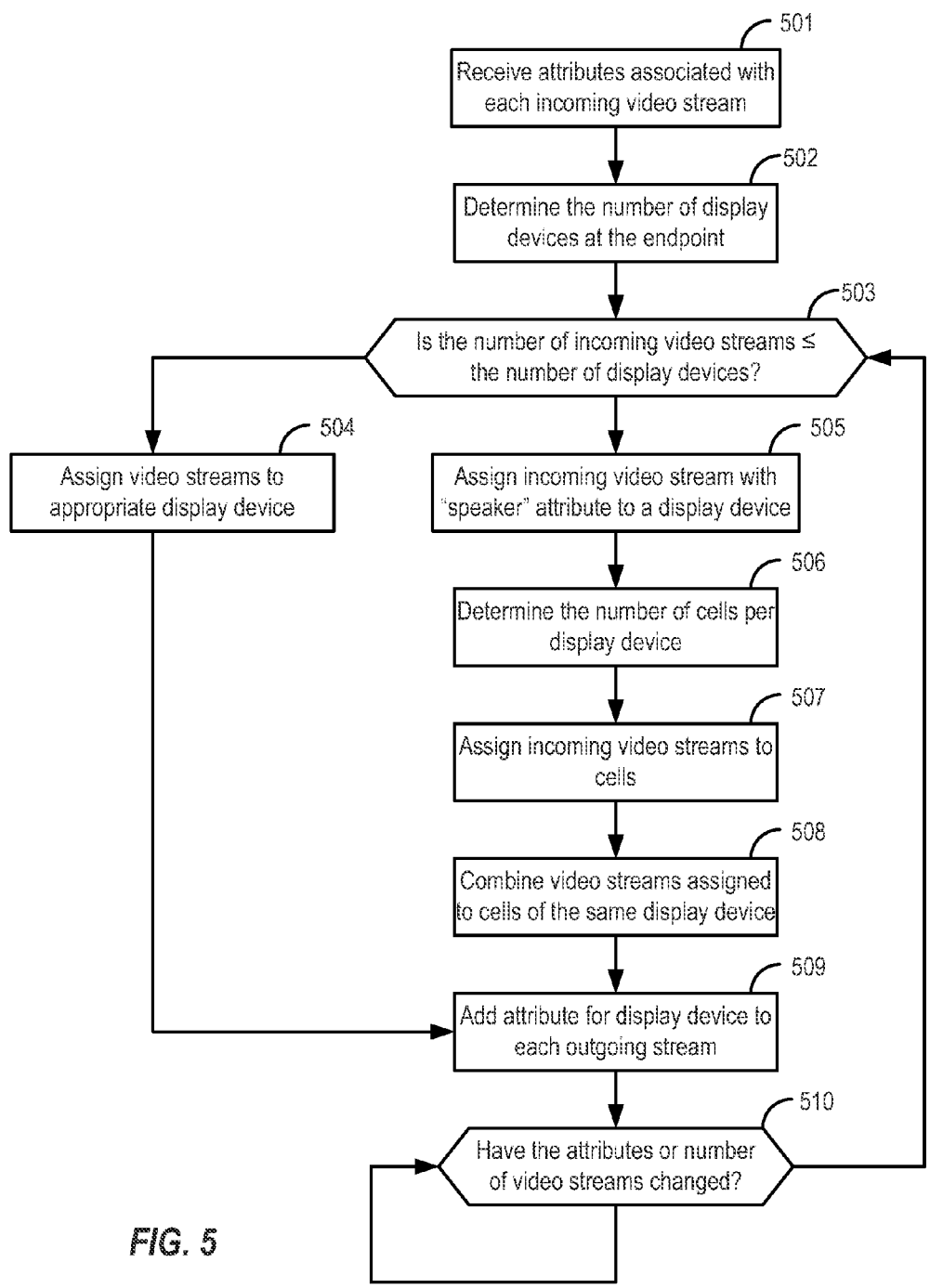
FIG. 5 illustrates exemplary steps performed by the layout manager in generating video layouts.

FIG. 5 shows an exemplary flowchart detailing the steps that can be performed by the layout manager 302 in determining the layout of video streams on the display devices at one endpoint. The layout manager 302 can perform similar steps for determining the layout of each of the other endpoints participating in the videoconference. In step 501, the layout manager 302 can receive attributes associated with each incoming video streams from all endpoints participating in a videoconferencing session. In step 502, layout manager 302 can determine the number of display devices at the endpoint. Information regarding the number of display devices and their properties can be received in real time in the form of configuration information. Such information can also be stored in memory at the MCU 106.

In step 503, the layout manager 302 can determine if the number of incoming streams to be displayed at the endpoint E exceeds the number of display devices at endpoint E. If the number of incoming streams to be displayed at endpoint E is less than or equal to the number of displays at endpoint E, then potentially, each display device can display a single video stream. Thus, the MCU 106 may not need to combine two or more video streams into one video stream. For example, if endpoint E were to have four display devices and is in a videoconferencing session with three other endpoints, each generating a single video stream, then the layout manager 302 can associate three display devices at endpoint E with the three other endpoints' video streams. The fourth display device can be assigned to receive the video stream that includes digital content or the video stream that includes the current speaker. Once the layout manager 302 assigns video streams to particular display devices (in step 504), the layout manager 302 can add attributes to the outgoing streams (in step 509). Such attributes can include the relative position of the display device on which the video stream is to be displayed, whether the video stream includes digital content, speaker, etc.

If the number of video streams to be displayed at endpoint E is greater than the number of display devices available, then two or more video streams can be combined into one video stream. Layout manager 302 can check if any of the display devices at endpoint E are dedicated to displaying only the current speaker. If yes, then the video stream with and attribute "Speaker" can be directed to that display device (step 505). The remaining display devices can be used to display the remaining video streams.

As an example, the number of cells per display device can be determined by dividing the total number of video streams to be displayed by the number of available display devices. But other factors, such as aspect ratios of the video streams and the display devices, the amount of acceptable downscaling of the video streams, etc., can also be considered in determining the number and size of the cells. Referring to the example shown in FIG. 4A, the layout manager 302 can determine that one of the display devices, 406, at endpoint E is reserved for displaying the video stream that includes the current speaker. Therefore, there are three display devices—402, 404, and 408—for displaying 11 video streams from endpoints A, B, C, and D. The layout manager 302 can divide the display area for two of the display devices into four cells, while divide the display area of the remaining display device into three cells. It is understood that this method of determining the number of cells per display device is only exemplary, and that other methods can also be envisioned.

In step 507, layout manager 302 can assign video streams to cells. If the video streams are of the same format and do not have any spatial inter-relationship, then the layout manager 302 can loosely assign a video stream to any cell. For example, the layout manager 302 can assign all video streams from one endpoint to cells within a single display device. But generally in videoconferencing—and particularly in telepresence videoconferencing—video streams received by the MCU 106 from an endpoint can represent portions of a complete image of the conference room, which video streams when displayed side-by-side can reproduce the image of the complete conference room. For example, referring to FIG. 4A, layout manager 302 can arrange 4 video streams received from endpoint A side-by-side in four cells 421, 422, 441, and 442, where cells 421 and 422 belong to one display device 402 while cells 441 and 442 belong to the adjacent display device 404. As a result, video streams from one endpoint can be distributed over multiple display devices. In other words, spatial relationship of displayed video steams can extend over multiple display devices. In a similar fashion, four video streams from endpoint B can be assigned to cells 423, 424, 443, and 444. Likewise, two video streams from endpoint B can be assigned to cells 482 and 483, while the single video stream from endpoint C can be assigned to cell 481.

Once incoming video streams have been assigned to their cells, the layout manager 302 can instruct the mixer 303 to combine video streams assigned to cells of the same display device (step 508). For example, referring to FIG. 4A, the four video streams labeled "A-FL," "A-CL," "B-FL," and "B-CL" associated with cells 421, 422, 441, and 442, respectively, can be combined into a single video stream. A combined video stream can have attributes that allow the receiving endpoint to determine which display device the combined video stream is to be displayed. For example, the combined video stream of video streams from cells 421, 422, 441, and 442 can have an attribute "FL" indicating the far left display device 402. In step 509, the layout manager 302 can instruct the mixer 303 to add attributes to the outgoing combined video streams. Attributes can also be added to video streams that are not a result of a combination of other video streams (as resulting from step 504).

Having configured the layout of outgoing video streams to each endpoint, the layout manager 302, in step 510, can monitor any change in attributes of the received video streams and/or change in the number of video streams. For example, if the attribute "Speaker" previously associated with one incoming video stream is now associated with a different incoming video stream, the layout manager 302 can detect this change, and reconfigure (in steps 503-509) the layout of the outgoing streams so that the video stream currently having the attribute "Speaker" is displayed appropriately at each endpoint. For example, referring to FIGS. 4A and 4B, when the "Speaker" attribute, previously associated with the video stream received from the center left camera of endpoint A (A-CL) is now associated with the video stream from the left camera of endpoint D (D-L), the layout manager 302 can reconfigure the layout so that video stream sent to the dedicated speaker display 406 is changed from A-CL to D-L. Additionally, if the number of incoming video streams from the participating endpoints changes, for example, when an endpoint exits a videoconference session, the layout manager 302 can detect this change, and reconfigure the outgoing video streams. Thus, the layout manager can provide dynamic reconfiguration of video stream layouts.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method for generating display content for a first endpoint communicating over a network with at least one other endpoint comprising:
    generating a display layout for the first endpoint, wherein generating the display layout further comprises:
    generating a plurality of cells, and
    assigning video streams received from the at least one other endpoint to the plurality of cells based at least in part on one or more positional or role-based attributes associated with each of the video streams; and
    mixing received video streams to generate one or more video streams for one or more cells, wherein mixing further comprises combining video streams; and
    wherein the display layout preserves a spatial relationship between at least two of the video streams received from the at least one other endpoint, and
    wherein the one or more positional attributes identify a relative location of a camera generating the received video stream.

2. The method of claim 1, wherein the display layout is a continuous presence layout.

3. The method of claim 1, wherein at least one video stream has more than one attribute associated with it.

4. The method of claim 1, further comprising dynamically regenerating the display layout in response to a change in any one of the positional or role-based attributes.

5. The method of claim 1, wherein generating a display layout comprises identifying a first video stream received from a first of at least one other endpoint, the associated positional or role-based attribute of which indicates that the first video stream includes an image of a first current speaker.

6. The method of claim 1, wherein generating the display layout further comprises assigning an attribute to an outgoing video stream, the attribute indicating that the outgoing video stream includes an image of a current speaker.

7. The method of claim 6, wherein generating the display layout further comprises identifying a second video stream received from a second of at least one other endpoint, the associated positional or role-based attribute of which indicates that the second video stream includes an image of a second current speaker, and assigning the second video stream to the outgoing stream.

8. A videoconferencing device comprising:
    a layout manager configured to generate a display layout based at least in part on positional or role-based attributes associated with video streams received from at least one other endpoint by generating a plurality of cells, and assigning video streams received from the at least one other endpoint to the plurality of cells; and a mixer communicably coupled to the layout manager and configured to mix received video streams associated with the plurality of cells; and wherein the display layout preserves a spatial relationship between at least two of the video streams received from the at least one other endpoint, and wherein the positional attributes identify a relative location of a camera generating the received video stream.

9. The videoconferencing device of claim 8, wherein the display layout is a continuous presence layout.

10. The videoconferencing device of claim 8, wherein at least one video stream has more than one attribute associated with it.

11. The videoconferencing device of claim 8, wherein the layout manager is configured to regenerate the display layout in response to a change in any of the positional or role-based attributes.

12. The videoconferencing device of claim 8, further comprising:

a stream attribute module communicably coupled to the layout manager and configured to determine attributes associated with video streams, wherein the stream attribute module identifies a first video stream received from a first of at least one other endpoint, the associated positional or role-based attribute of which indicates that the first video stream includes an image of a first current speaker.

13. The videoconferencing device of claim 12, wherein the layout manager is configured to assign the first video stream to an outgoing video stream, and wherein the stream attribute module is configured to assign an attribute to the outgoing video stream, the attribute indicating that the outgoing video stream includes an image of a current speaker.

14. The videoconferencing device of claim 13, wherein the stream attribute module identifies a second video stream received from a second of at least one other endpoint, the associated positional or role-based attribute of which indicates that that the second video stream includes a second current speaker, and wherein the layout manager assigns the second video stream to the outgoing video stream.

15. The videoconferencing device of claim 8, wherein the videoconferencing device is an MCU.

16. The videoconferencing device of claim 15 wherein the MCU is located at an endpoint.

17. The videoconferencing device of claim 8 wherein the videoconferencing device is an endpoint.

* * * * *